(12) United States Patent
Zhang et al.

(10) Patent No.: US 12,053,882 B2
(45) Date of Patent: Aug. 6, 2024

(54) TWO-LAYER THREE-RAIL PLANAR ROBOT WITH PARALLELOGRAM

(71) Applicant: Shandong University of Technology, Zibo (CN)

(72) Inventors: Yanfei Zhang, Zibo (CN); Jinliang Gong, Zibo (CN); Yubin Lan, Zibo (CN); Wei Wang, Zibo (CN)

(73) Assignee: SHANDONG UNIVERSITY OF TECHNOLOGY, Zibo (CN)

( * ) Notice: Subject to any disclaimer, the term of this patent is extended or adjusted under 35 U.S.C. 154(b) by 0 days.

(21) Appl. No.: 18/220,453

(22) Filed: Jul. 11, 2023

(65) Prior Publication Data

US 2023/0347504 A1    Nov. 2, 2023

Related U.S. Application Data

(63) Continuation of application No. PCT/CN2021/108819, filed on Jul. 28, 2021.

(30) Foreign Application Priority Data

Jan. 12, 2021 (CN) .......................... 202110038357.9

(51) Int. Cl.
*B25J 9/00* (2006.01)
*B25J 5/02* (2006.01)

(52) U.S. Cl.
CPC ............... *B25J 9/0045* (2013.01); *B25J 5/02* (2013.01); *B25J 9/0033* (2013.01)

(58) Field of Classification Search
CPC ........... B25J 9/0033; B25J 9/0045; B25J 5/02
See application file for complete search history.

(56) References Cited

U.S. PATENT DOCUMENTS

| | | | |
|---|---|---|---|
| 2019/0118373 A1* | 4/2019 | Jeong | B25J 9/1623 |
| 2019/0389054 A1* | 12/2019 | Zhao | B25J 9/0009 |
| 2023/0347507 A1* | 11/2023 | Lan | B25J 9/1065 |

* cited by examiner

*Primary Examiner* — Charles A Fox
*Assistant Examiner* — Gregory T Prather
(74) *Attorney, Agent, or Firm* — WPAT, PC

(57) ABSTRACT

Disclosed is a two-layer three-rail planar robot with a parallelogram, including a fixed platform, a moving platform, and three branched chains. Three planar curved rails I are provided on the fixed platform. Three planar curved rails II are fixedly connected to the moving platform. Each planar curved rail I is connected to a planar curved rail II corresponding to the planar curved rail I by one of the branched chains. Each of the branched chains includes a slider I, two connecting rods provided in parallel, a slider II. The slider I is slidably connected to the planar curved rail I. The slider I is rotatably connected to one end of each connecting rod by a revolute pair I, the other end of the connecting rod is rotatably connected to the slider II by a revolute pair II. The slider II is slidably connected to the planar curved rail II.

4 Claims, 5 Drawing Sheets

TWO-LAYER THREE-RAIL PLANAR ROBOT WITH PARALLELOGRAM

TECHNICAL FIELD

The present invention relates to the field of robotics, and in particular, to a two-layer three-rail planar robot with a parallelogram.

BACKGROUND

Parallel robots are characterized by high stiffness, high load capacity, high precision, low motion load, and easy inversion, and are therefore widely applied to aspects such as motion simulators, virtual-axis machine tools, motion sensing simulators, medical devices, and agricultural work robots.

For the research of three-degree-of-freedom robots, many scholars have carried out a lot of work. Based on a 3-RRR parallel robot, YU Yueqing proposed an experimental apparatus of a planar parallel robot with three flexible hinges. The apparatus can enable a moving platform of the mechanism to implement movements in an X-axis direction and a Y-axis direction and a rotation around a Z-axis direction. Herve successfully integrated a three-degree-of-freedom translational parallel robot such as a 3-RRC parallel robot based on the theory of Lie group and Lie algebra. Based on the spiral theory principle, HUANG Zhen provided an integration method of a low degree of freedom parallel robot including various three-degree-of-freedom translational parallel robots. LI Qinchuan used the screw theory to perform systemic integration of a symmetrical three-degree-of-freedom parallel robot. Based on the GF set theory, GAO Feng integrated various symmetrical and asymmetrical three-degree-of-freedom translational parallel robots with novel structures. In the year 2011, CHEN Fengming et al. provided a novel two-translation and one-rotation RRR-URR-RR parallel robot, analyzed movement output characteristics of this mechanism, calculated degrees of freedom, and established direct and inversion equations for the parallel robot. In the year 2016, ZHU Wei et al. from Changzhou University invented a two-translation and one-rotation parallel robot, and used three active moving kinematic pairs to drive a movable platform to move, to implement two-dimensional translation and one-dimensional rotation in space. In the year 2018, LI Yanwen et al. from Yanshan University provided a two-translation and one-rotation 2RRR-CRR parallel robot. The mechanism only includes sliding pairs and revolute pairs (a cylindrical pair is formed by a sliding pair and a revolute pair), and mostly revolute pairs are used, so that the mechanism has a simple structure and axial relationships are easily met.

Although scholars from home and abroad have provided many three-degree-of-freedom robot configuration schemes, planar three-degree-of-freedom robots have different performance requirements in different application fields. Therefore, it is of great significance for type selection by researchers in the art to provide as many as possible robot configuration types with two translational degrees of freedom and one rotational degree of freedom.

SUMMARY

A technical problem to be resolved by the present invention is to provide a two-layer three-rail planar robot with a parallelogram to overcome deficiencies in the prior art. The robot has a novel structure and has two translational degrees of freedom and one rotational degree of freedom.

This scheme is implemented by using the following technical measures: A two-layer three-rail planar robot with a parallelogram includes a fixed platform, a moving platform, and three branched chains of a same structure connected between the fixed platform and the moving platform. Three planar curved rails I are provided on the fixed platform. Three planar curved rails II are fixedly connected to the moving platform. Each planar curved rail I is connected to a planar curved rail II corresponding to the planar curved rail I by one of the branched chains. Each of the branched chains includes a slider I, two connecting rods provided in parallel, and a slider II. The slider I is slidably connected to the planar curved rail I. The slider I is rotatably connected to one end of each connecting rod by a revolute pair I, and the other end of the connecting rod is rotatably connected to the slider II by a revolute pair II. The slider II is slidably connected to the planar curved rail II. In one of the branched chains, a distance between a revolute pair I and a revolute pair II connected at two ends of one connecting rod is equal to a distance between a revolute pair I and a revolute pair II connected at two ends of the other connecting rod. Axes of the six revolute pairs I are parallel to each other, and are all perpendicular to a moving plane I of the slider I relative to the planar curved rail I and a moving plane II of the slider II relative to the planar curved rail II. Axes of the six revolute pairs II are parallel to each other, and are all perpendicular to the moving plane I of the slider I relative to the planar curved rail I and the moving plane II of the slider II relative to the planar curved rail II. The three sliders II or the three sliders I are driving links. The three planar curved rails I are arc-shaped rails with different centers, and the three planar curved rails II are arc-shaped rails with different centers.

Preferably, a length of the planar curved rail I is greater than a length of the planar curved rail II, and a width of the planar curved rail I is greater than a width of the planar curved rail II.

Preferably, the three planar curved rails II are fixedly connected to the moving platform by three fixed rods.

Preferably, moving planes I of the three sliders I relative to the planar curved rails I are a same plane or parallel planes.

Preferably, moving planes II of the three sliders II relative to the planar curved rails II are a same plane or parallel planes.

Compared with the prior art, the advantages of the present invention are as follows: A three-rail structure is introduced into both a fixed platform and a moving platform, and is used in combination with a slider I, a revolute pair I, a connecting rod, a revolute pair II, and a slider II, so that it is ensured that a robot has a movement feature of two translational degrees of freedom and one rotational degree of freedom, and operation space can be increased at specific degrees of freedom by independently increasing the lengths of rails and/or the length of the connecting rod, thereby improving the flexibility of robot design. The slider I, two connecting rods provided in parallel, and the slider II may form a parallelogram structure. Specifically, rotational connecting points of the two connecting rods, the slider I, and the slider II are four vertexes of a parallelogram, so that the movement is stable. In addition, in the structure, three sliders I and three sliders II may all be driving links, thereby improving the flexibility of selecting a robot driving manner.

As can be seen, compared with the prior art, the present invention has prominent substantial characteristics and significant progress, and the implementation of the present invention has obvious beneficial effects.

BRIEF DESCRIPTION OF DRAWINGS

For clearer descriptions of the technical schemes in the present invention, the following briefly introduces the accompanying drawings required for description. Apparently, the accompanying drawings in the following description show merely some embodiments of the present invention, and a person of ordinary skill in the art may still derive other drawings from these accompanying drawings without creative efforts.

Figure 1:
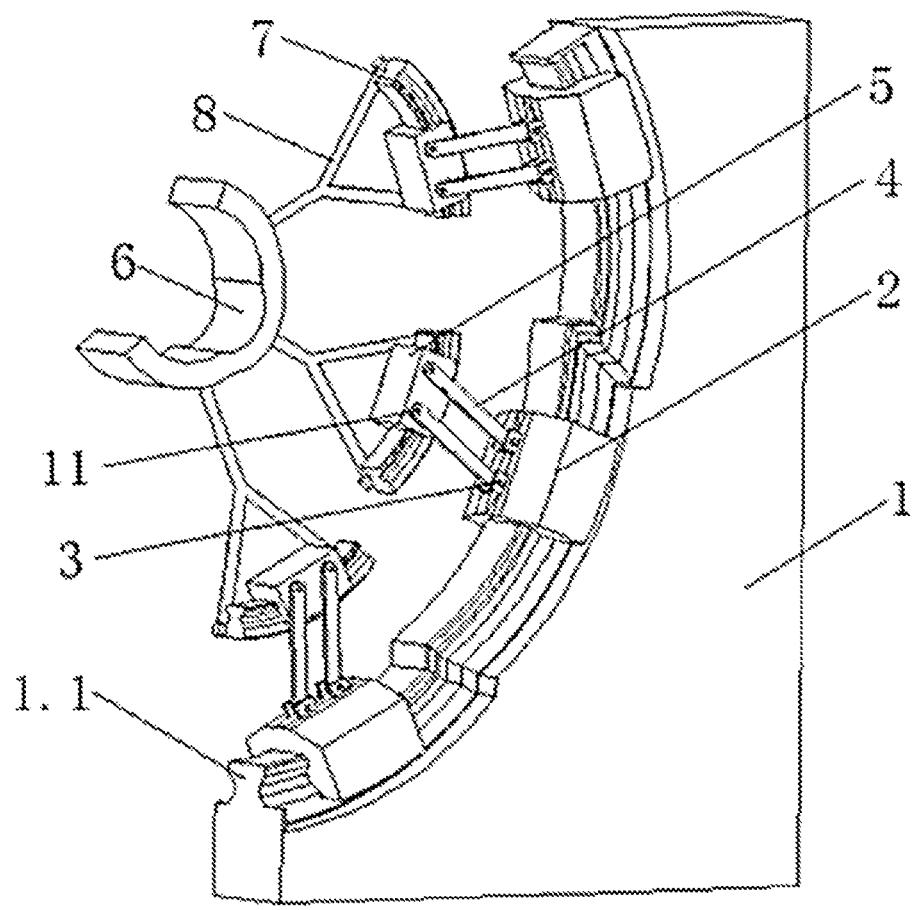
FIG. 1 is a schematic structural diagram according to the present invention.

Reference numerals: 1—fixed platform, 1.1—planar curved rail I, 2—slider I, 3—revolute pair I, 4—connecting rod, 5—slider II, 6—moving platform, 7—planar curved rail II, 8—fixed rod, 9—moving plane I, 10—moving plane II, and 11—revolute pair II.

DETAILED DESCRIPTION OF EMBODIMENTS

To make the inventive objectives, features, and advantages of the present invention clearer and more comprehensible, the technical schemes that the present invention seeks to protect is clearly and completely described below with reference to specific embodiments and the accompanying drawings. Apparently, the embodiments described below are merely some rather than all of the embodiments of the present invention. All other embodiments obtained by a person of ordinary skill in the art based on the embodiments of the present invention without creative efforts shall fall within the protection scope of the present invention.

As shown in FIG. 1, a two-layer three-rail planar robot with a parallelogram includes a fixed platform 1, a moving platform 6, and three branched chains of the same structure connected between the fixed platform 1 and the moving platform 6. Three planar curved rails I 1.1 are provided on the fixed platform 1. Three planar curved rails II 7 are fixedly connected to the moving platform 6. Each planar curved rail I 1.1 is connected to a planar curved rail II 7 corresponding to the planar curved rail I 1.1 by one of the branched chains. Each of the branched chains includes a slider I 2, two connecting rods 4 provided in parallel, and a slider II 5. The slider I 2 is slidably connected to the planar curved rail I 1.1. The slider I 2 is rotatably connected to one end of each connecting rod 4 by a revolute pair I 3, and the other end of the connecting rod 4 is rotatably connected to the slider II 5 by a revolute pair II 11. The slider II 5 is slidably connected to the planar curved rail II 7. In one of the branched chains, a distance between a revolute pair I 3 and a revolute pair II 11 connected at two ends of one connecting rod 4 is equal to a distance between a revolute pair I 3 and a revolute pair II 11 connected at two ends of the other connecting rod 4. Axes of the six revolute pairs I 3 are parallel to each other, and are all perpendicular to a moving plane I 9 of the slider I 2 relative to the planar curved rail I 1.1 and a moving plane II 10 of the slider II 5 relative to the planar curved rail II 7. Axes of the six revolute pairs II 11 are parallel to each other, and are all perpendicular to the moving plane I 9 of the slider I 2 relative to the planar curved rail I 1.1 and the moving plane II 10 of the slider II 5 relative to the planar curved rail II 7. The three sliders II 5 or the three sliders I 2 are driving links. The three planar curved rails I 1.1 are arc-shaped rails with different centers, and the three planar curved rails II 7 are arc-shaped rails with different centers. Preferably, the three planar curved rails I 1.1 are circular arc-shaped rails with different centers, and the three planar curved rails II 7 are circular arc-shaped rails with different centers.

In this technical scheme, the three branched chains with the same structure refer to that the three branched chains include the same components and have the same connection relationships between the components. However, the same components in the three branched chains may have different sizes.

The length of the planar curved rail I 1.1 is greater than the length of the planar curved rail II 7, and the width of the planar curved rail I 1.1 is greater than the width of the planar curved rail II 7.

The moving platform 6 is fixedly connected to the three planar curved rails II 7 by three fixed rods 8.

Figure 2:
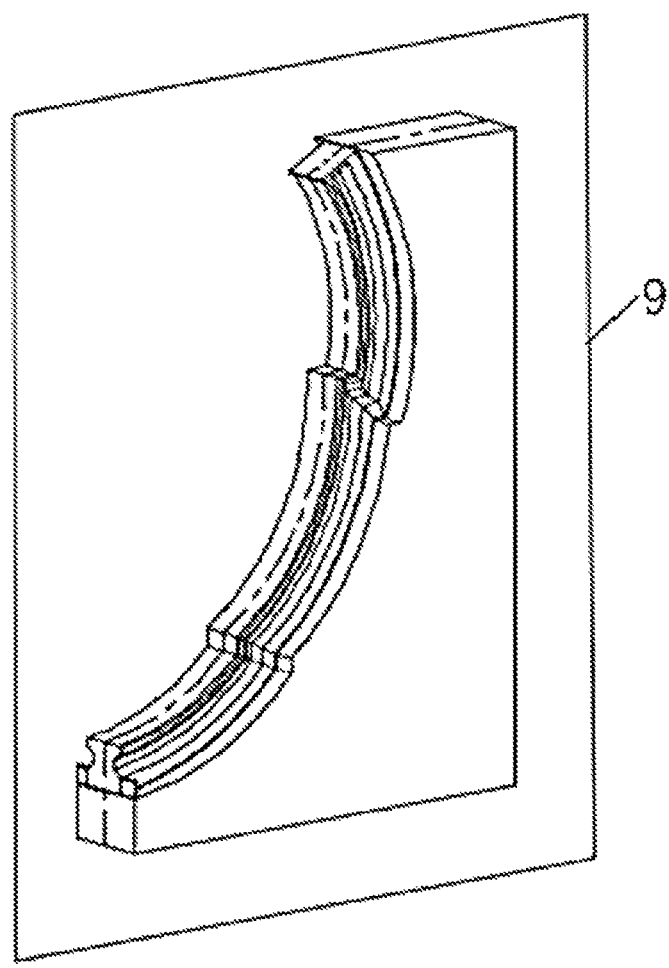
FIG. 2 is a schematic structural diagram one of a fixed platform.
Figure 3:
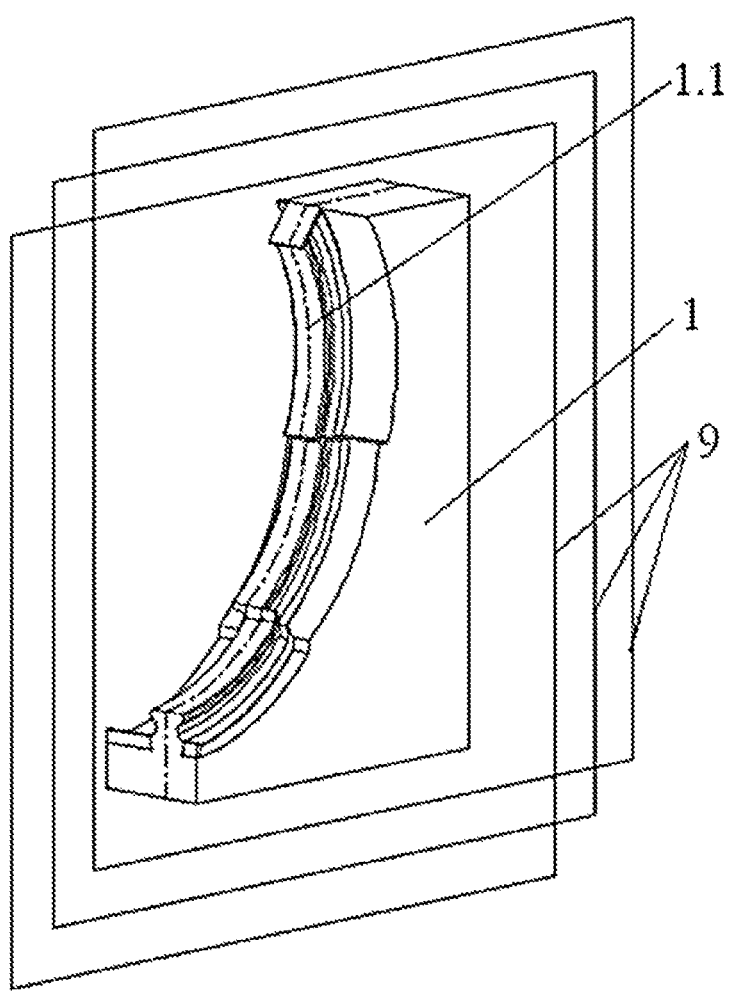
FIG. 3 is a schematic structural diagram two of a fixed platform.

As shown in FIGS. 2 and 3, three moving planes I 9 of the three sliders I 2 respectively relative to the three planar curved rails I 1.1 are the same plane or parallel planes.

Figure 4:
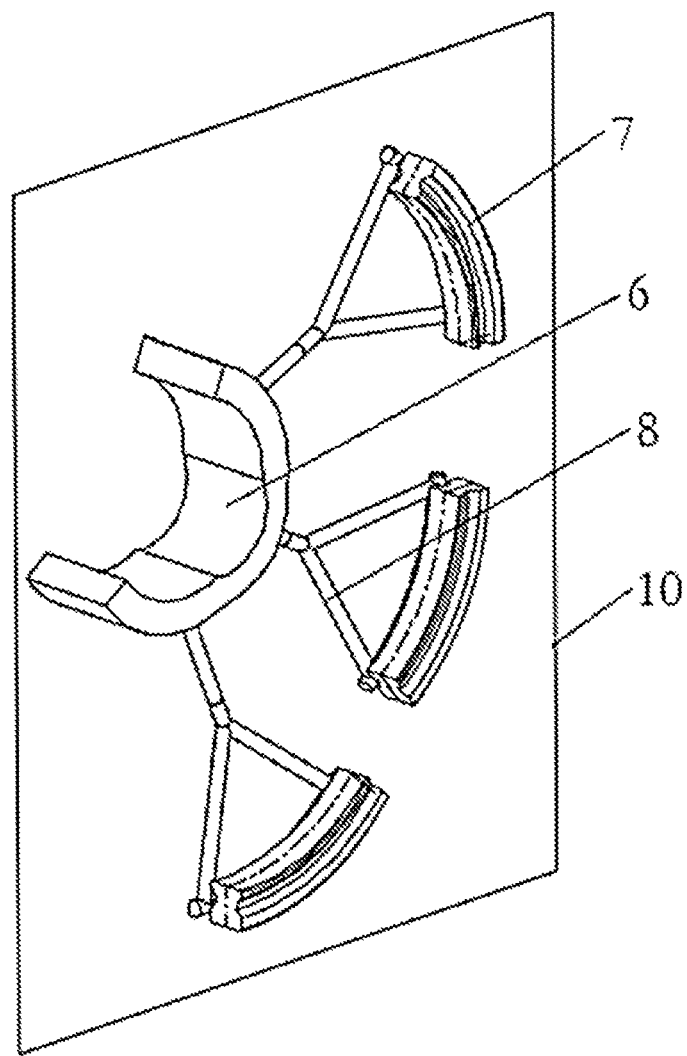
FIG. 4 is a schematic structural diagram one of a connection between a moving platform and a planar curved rail II.
Figure 5:
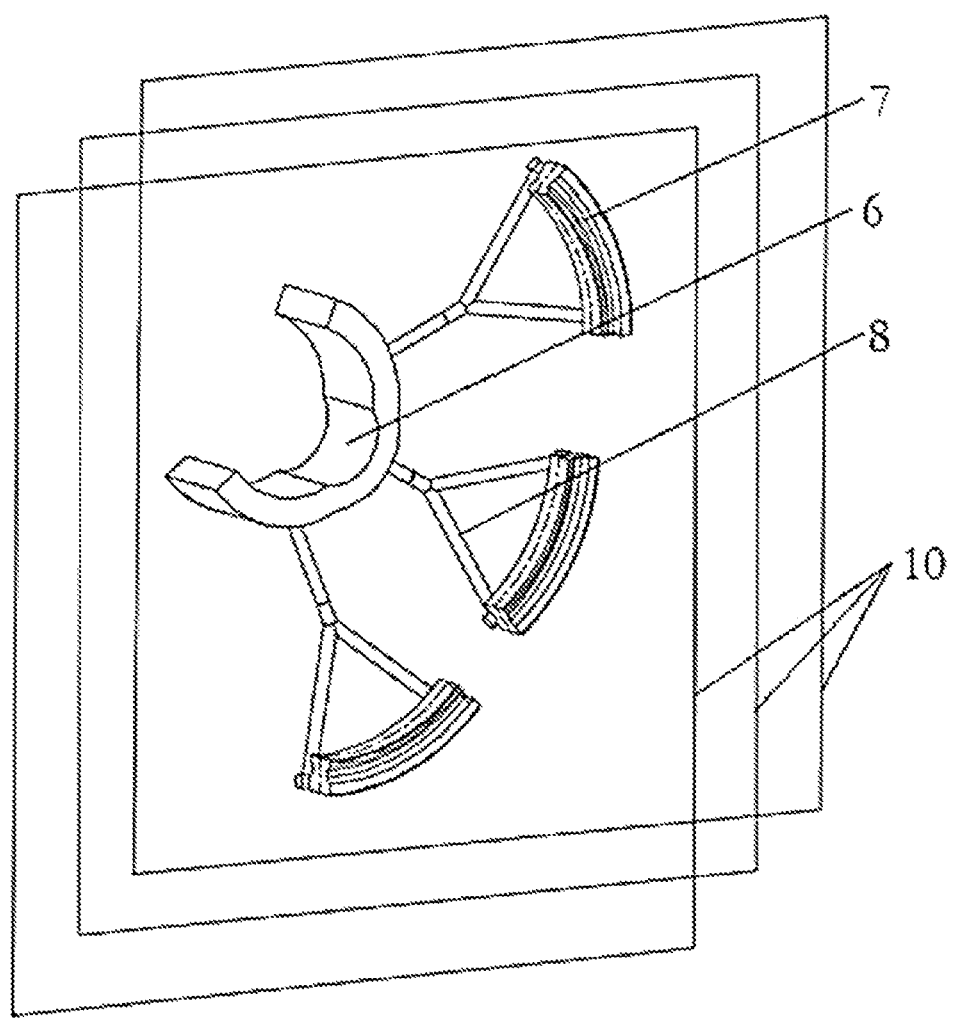
FIG. 5 is a schematic structural diagram two of a connection between a moving platform and a planar curved rail II.

As shown in FIGS. 4 and 5, three moving planes II 10 of the three sliders II 5 respectively relative to the three planar curved rails II 7 are the same plane or parallel planes.

In this technical scheme, the planar curved rail I 1.1, as implied by the name, is configured for the slider I 2 to make a curved planar movement along the rail; and the planar curved rail II 7, as implied by the name, is configured for the slider II 5 to make a curved planar movement along the rail.

All embodiments are described in the present invention by using the progressive method. Each embodiment describes only the difference from other embodiments. For the same or similar parts among all embodiments, reference may be made to the relevant parts.

The foregoing description of the disclosed embodiments is presented to enable a person skilled in the art to implement or use the present invention. Various modifications to these embodiments are readily apparent to a person skilled in the art. The general principle defined herein may be implemented in other embodiments without departing from the spirit or scope of the present invention. Thus, the present invention is not to be limited to these embodiments shown herein, but are to be accorded with the broadest scope consistent with the principles, novel features, and creative characteristics disclosed herein.

What is claimed is:

1. A two-layer three-rail planar robot, comprising a fixed platform (1), a moving platform (6), and three branched chains connected between the fixed platform (1) and the moving platform (6), wherein three planar curved rails I (1.1) are provided on the fixed platform (1), three planar curved rails II (7) are fixedly connected to the moving platform (6), each planar curved rail I (1.1) is connected to a respective planar curved rail II (7) by a respective branched chain;

wherein each of the branched chains comprises:
a slider I (2),
two connecting rods (4) provided in parallel, and
a slider II (5), wherein the slider I (2) is slidably connected to a respective one of the planar curved rails I (1.1), the slider I (2) is rotatably connected to one end of each connecting rod (4) by a revolute pair I (3), the other end of each connecting rod (4) is rotatably connected to the slider II (5) by a revolute pair II (11), the slider II (5) is slidably connected to a respective one of the planar curved rails II (7), and in each of the branched chains, a distance between a revolute pair I (3) and a revolute pair II (11) connected at two ends of one of the two connecting rods (4) is equal to a distance between a revolute pair I (3) and a revolute pair II (11) connected at two ends of the other connecting rod (4) of the two connecting rods (4);

wherein axes of the six revolute pairs I (3) are parallel to each other, and are all perpendicular to a moving plane I (9) of each slider I (2) relative to the respective planar curved rail I (1.1) and a moving plane II (10) of each slider II (5) relative to the respective planar curved rail II (7); axes of the six revolute pairs II (11) are parallel to each other, and are all perpendicular to the moving plane I (9) of each slider I (2) relative to the respective planar curved rail I (1.1) and the moving plane II (10) of each slider II (5) relative to the respective planar curved rail II (7); the three sliders II (5) or the three sliders I (2) are driving links;

wherein the three planar curved rails I (1.1) are arc-shaped rails with different centers, and the three planar curved rails II (7) are arc-shaped rails with different centers; and wherein the three planar curved rails II (7) are fixedly connected to the moving platform (6) by three fixed rods (8).

2. The two-layer three-rail planar robot of claim 1, wherein a length of each planar curved rail I (1.1) is greater than a length of the respective planar curved rail II (7), and a width of each planar curved rail I (1.1) is greater than a width of the respective planar curved rail II (7).

3. The two-layer three-rail planar robot of claim 1, wherein the moving planes I (9) of the three sliders I (2) relative to the respective planar curved rails I (1.1) are a same plane or parallel planes.

4. The two-layer three-rail planar robot of claim 1, wherein the moving planes II (10) of the three sliders II (5) relative to the respective planar curved rails II (7) are a same plane or parallel planes.

* * * * *